(12) United States Patent
Aizawa et al.

(10) Patent No.: US 12,236,577 B2
(45) Date of Patent: Feb. 25, 2025

(54) IMAGE ANALYSIS DEVICE, CONTROL DEVICE, MECHANICAL SYSTEM, IMAGE ANALYSIS METHOD, AND COMPUTER PROGRAM FOR IMAGE ANALYSIS

(71) Applicant: FANUC CORPORATION, Yamanashi (JP)

(72) Inventors: Tomoyuki Aizawa, Yamanashi (JP); Junichi Tezuka, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 355 days.

(21) Appl. No.: 17/759,188

(22) PCT Filed: Jan. 18, 2021

(86) PCT No.: PCT/JP2021/001505
§ 371 (c)(1),
(2) Date: Jul. 21, 2022

(87) PCT Pub. No.: WO2021/149646
PCT Pub. Date: Jul. 29, 2021

(65) Prior Publication Data
US 2023/0066114 A1    Mar. 2, 2023

(30) Foreign Application Priority Data
Jan. 22, 2020    (JP) ................. 2020-008390

(51) Int. Cl.
*G06T 7/00* (2017.01)
*G05B 19/418* (2006.01)
(Continued)

(52) U.S. Cl.
CPC ........ *G06T 7/001* (2013.01); *G05B 19/41875* (2013.01); *G06T 7/20* (2013.01);
(Continued)

(58) Field of Classification Search
None
See application file for complete search history.

(56) References Cited

U.S. PATENT DOCUMENTS

| 2015/0261207 | A1* | 9/2015 | Wunderlich | G05B 19/4065 700/175 |
| 2018/0307203 | A1* | 10/2018 | Aizawa | G05B 19/4065 |
| 2023/0066114 | A1* | 3/2023 | Aizawa | G06T 7/20 |

FOREIGN PATENT DOCUMENTS

| JP | 201092405 A | 4/2010 |
| JP | 201122688 A | 2/2011 |

(Continued)

OTHER PUBLICATIONS

A positioning error self-correction method for image measuring instrument . Hu et al. (Year: 2012).*

*Primary Examiner* — Delomia L Gilliard
(74) *Attorney, Agent, or Firm* — HAUPTMAN HAM, LLP

(57) ABSTRACT

Various factors may cause an error between the shape of a workpiece machined by an industrial machine and the target shape of the workpiece. An image analysis device includes a first image generating section that generates first image data indicating a first distribution of locations on a workpiece of an error between a shape of the workpiece machined by an industrial machine and a pre-prepared target shape of the workpiece; a second image generating section that generates second image data indicating a second distribution of locations on the workpiece of an error between a command transmitted to the industrial machine for machining the workpiece and feedback from the industrial machine corresponding to the command; and a correlation acquisition section that obtains a correlation between the first distribution and the second distribution, based on the first image data and the second image data.

10 Claims, 16 Drawing Sheets

(51) Int. Cl.
*G06T 7/20* (2017.01)
*G06T 7/70* (2017.01)
(52) U.S. Cl.
CPC ...... *G06T 7/70* (2017.01); *G05B 2219/32368* (2013.01); *G06T 2207/30164* (2013.01)

(56) References Cited

FOREIGN PATENT DOCUMENTS

| JP | 2013196309 A | 9/2013 |
| JP | 2018181216 A | 11/2018 |
| WO | 2018225159 A1 | 12/2018 |

\* cited by examiner

IMAGE ANALYSIS DEVICE, CONTROL DEVICE, MECHANICAL SYSTEM, IMAGE ANALYSIS METHOD, AND COMPUTER PROGRAM FOR IMAGE ANALYSIS

RELATED APPLICATIONS

The present application is a National Phase of International Application No. PCT/JP2021/001505, filed Jan. 18, 2021, which claims Japanese application No. 2020-008390 filed Jan. 22, 2020.

TECHNICAL FIELD

The present invention relates to an image analysis device, a control device, a mechanical system, an image analysis method, and a computer program for image analysis.

BACKGROUND ART

A known device generates an image of the movement path of a tool of an industrial machine and displays a position on the path where positional deviation occurred on the image (e.g., Patent Document 1).

CITATION LIST

Patent Literature

Patent Document 1: JP 2011-022688 A

SUMMARY OF THE INVENTION

Technical Problem

Various factors may cause an error between the shape of a workpiece machined by an industrial machine and the target shape of the workpiece. There is a need for a technique to easily identify the cause of such an error.

Solution to Problem

According to an aspect of the present disclosure, an image analysis device includes a first image generating section configured to generate first image data indicating a first distribution of a location on a workpiece of an error between a shape of the workpiece machined by an industrial machine and a pre-prepared target shape of the workpiece; a second image generating section configured to generate second image data indicating a second distribution of a location on the workpiece of an error between a command transmitted to the industrial machine for machining the workpiece and feedback from the industrial machine, which corresponds to the command; and a correlation acquisition section configured to obtain a correlation between the first distribution and the second distribution, based on the first image data and the second image data.

According to another aspect of the present disclosure, an image analysis method includes generating first image data indicating a first distribution of a location on a workpiece of an error between a shape of the workpiece machined by an industrial machine and a target shape of the workpiece; generating second image data indicating a second distribution of a location on the workpiece of an error between a command transmitted to the industrial machine for machining the workpiece and feedback from the industrial machine, which corresponds to the command; and obtaining a correlation between the first distribution and the second distribution, based on the first image data and the second image data.

According to yet another aspect of the present disclosure, a computer program, for image analysis, causes a computer to function as: a first image generating section configured to generate first image data indicating a first distribution of a location on a workpiece of an error between a shape of the workpiece machined by an industrial machine and a pre-prepared target shape of the workpiece; a second image generating section configured to generate second image data indicating a second distribution of a location on the workpiece of an error between a command transmitted to the industrial machine for machining the workpiece and feedback from the industrial machine, which corresponds to the command; and a correlation acquisition section configured to obtain a correlation between the first distribution and the second distribution, based on the first image data and the second image data.

Advantageous Effect of the Invention

According to the present disclosure, by taking into account the correlation between a first distribution and a second distribution, an operator can determine whether or not an error between a post-machining workpiece shape and a target shape is highly likely to have been caused by an error between a command and feedback. Accordingly, the operator can easily identify the cause of the error between the post-machining workpiece shape and the target shape.

DESCRIPTION OF EMBODIMENTS

Figure 1:
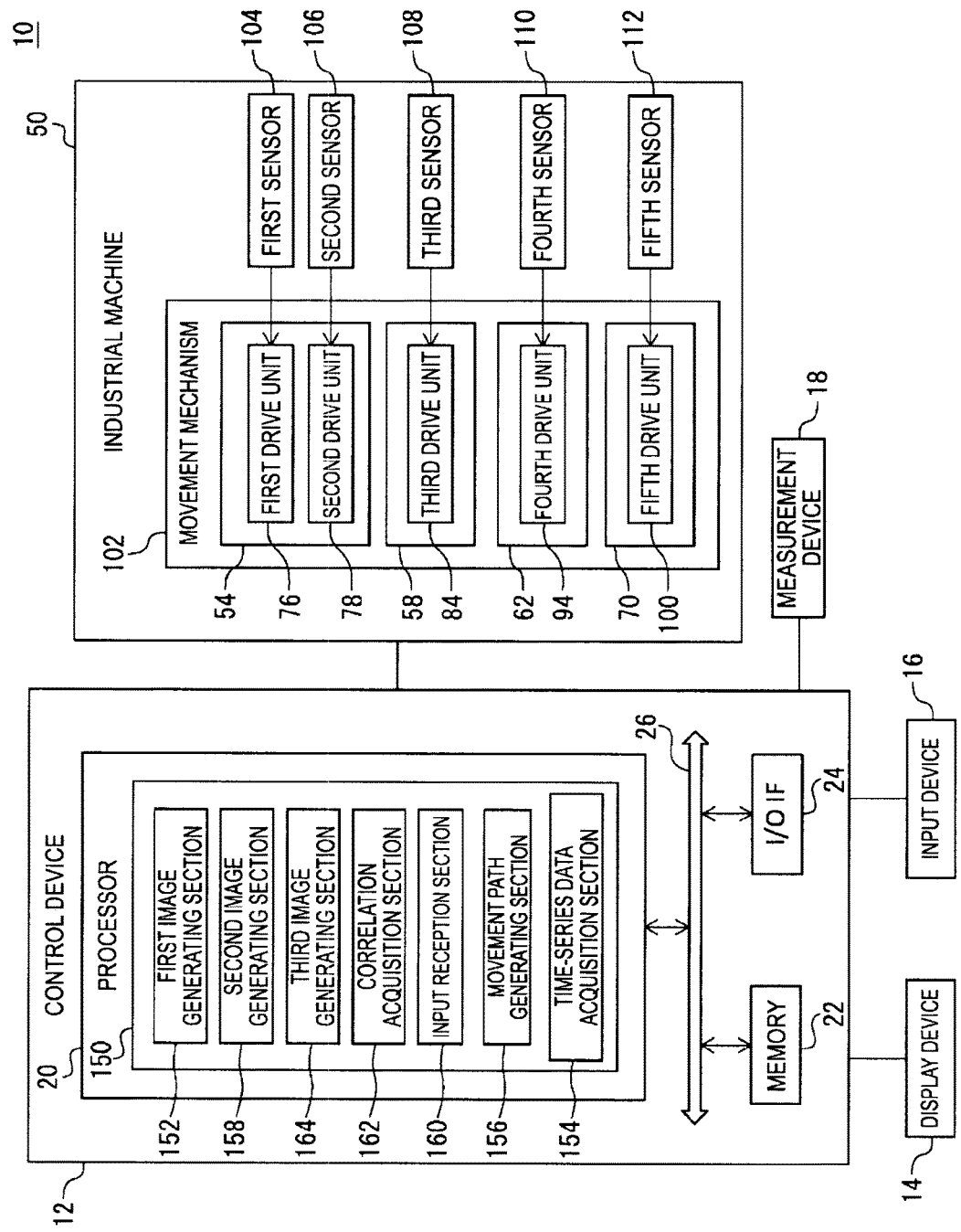
FIG. 1 is a block diagram of a mechanical system according to an embodiment.

Hereinafter, embodiments of the present disclosure will be described in detail with reference to the drawings. Note that in various embodiments described below, the same elements are denoted by the same reference signs, and redundant description will be omitted. Referring first to FIG. 1, a mechanical system 10 according to an embodiment will be described. The mechanical system 10 includes a control device 12, a display device 14, an input device 16, a measurement device 18, and an industrial machine 50.

The control device 12 controls the operation of the display device 14, the input device 16, the measurement device 18, and the industrial machine 50. Specifically, the control device 12 is a computer including a processor 20, a memory 22, and an I/O interface 24. The processor 20 includes a CPU, a GPU, or the like, and executes arithmetic processing to perform various functions, which will be described later. The processor 20 is communicably connected to the memory 22 and the I/O interface 24 via a bus 26.

The memory 22 includes a ROM, a RAM, or the like, and stores various types of data temporarily or permanently. The I/O interface 24 communicates with an external device, receives data from the external device, and transmits data to the external device, under the command of the processor 20. In the present embodiment, the display device 14, the input device 16, the measurement device 18, and the industrial machine 50 are communicably connected to the I/O interface 24 by a wireless or wired connection.

The display device 14 includes an LCD, an organic EL display, or the like, and the processor 20 transmits image data to the display device 14 via the I/O interface 24 for causing the display device 14 to display the image. The input device 16 includes a keyboard, mouse, touch sensor, or the like, and transmits information input by the operator to the processor 20 via the I/O interface 24. The display device 14 and the input device 16 may be integrally provided in the control device 12, or may be provided separately from the control device 12.

The measurement device 18 is a laser scanning type three-dimensional scanner or a three-dimensional measurement device including a stereo camera and measures the three-dimensional shape of an object such as a workpiece W described below. The measurement device 18 transmits measurement data of the shape of the object measured to the processor 20 via the I/O interface 24.

Figure 2:
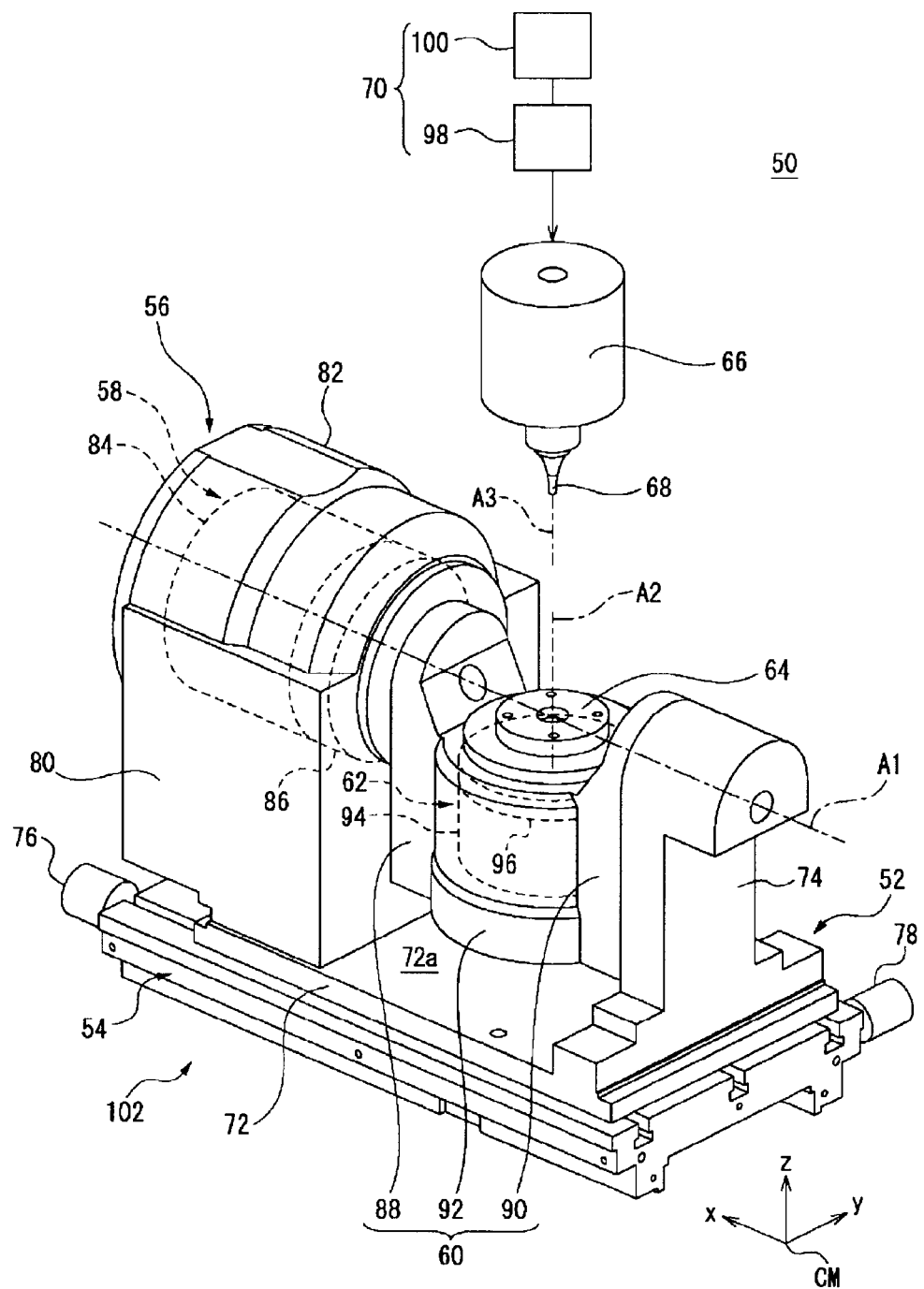
FIG. 2 is a perspective view of an industrial machine according to an embodiment.

The industrial machine 50 machines the workpiece W. Hereinafter, the industrial machine 50 according to an embodiment will be described with reference to FIG. 2. The industrial machine 50 according to the present embodiment is a so-called 5-axis machining center and includes a base table 52, a translational movement mechanism 54, a support base 56, a swinging movement mechanism 58, a swinging member 60, a rotational movement mechanism 62, a work table 64, a spindle head 66, a tool 68, and a spindle movement mechanism 70.

The base table 52 includes a base plate 72 and a pivot portion 74. The base plate 72 is a substantially rectangular flat plate-like member, and is disposed on the translational movement mechanism 54. The pivot portion 74 is formed integrally with the base plate 72 to protrude upward from a top face 72a of the base plate 72.

The translational movement mechanism 54 moves the base table 52 back and forth in the x-axis direction and the y-axis direction of a machine coordinate system CM. Specifically, the translational movement mechanism 54 includes an x-axis ball screw mechanism (not illustrated) that reciprocates the base table 52 in the x-axis direction, a y-axis ball screw mechanism (not illustrated) that reciprocates the base table 52 in the y-axis direction, a first drive unit 76 that drives the x-axis ball screw mechanism, and a second drive unit 78 that drives the y-axis ball screw mechanism.

The first drive unit 76 is, for example, a servo motor and rotates the rotary shaft of the first drive unit 76 in accordance with a command from the control device 12. The x-axis ball screw mechanism converts the rotational motion of the output shaft of the first drive unit 76 into reciprocating motion along the x-axis of the machine coordinate system CM. Similarly, the second drive unit 78 is, for example, a servo motor and rotates the rotary shaft of the second drive unit 78 in accordance with a command from the control device 12, and the y-axis ball screw mechanism converts the rotational motion of the output shaft of the second drive unit 78 into reciprocating motion along the y-axis of the machine coordinate system CM.

The support base 56 is fixed to the base table 52. Specifically, the support base 56 includes a base 80 and a drive unit housing portion 82. The base 80 is a hollow member having a substantially quadrangular prism shape, and is fixed to the top face 72a of the base plate 72 to protrude upward from the top face 72a. The drive unit housing portion 82 is a substantially semicircular hollow member and is formed integrally with an upper end portion of the base 80.

The swinging movement mechanism 58 includes a third drive unit 84 and a reduction gear 86. The third drive unit 84 and the reduction gear 86 are installed inside the base 80 and the drive unit housing portion 82. The third drive unit 84 is, for example, a servo motor and rotates the output shaft of the third drive unit 84 in accordance with a command from the control device 12. The reduction gear 86 reduces the rotational speed of the output shaft of the third drive unit 84 and transmits it to the swinging member 60. Also, the swinging movement mechanism 58 rotates the swinging member 60 about an axis line A1.

The swinging member 60 is supported in a manner allowing for rotation about the axis line A1 by the support base 56 and the pivot portion 74. Specifically, the swinging member 60 includes a pair of holding portions 88 and 90 disposed to face each other in the x-axis direction and a drive unit housing portion 92 fixed to the holding portions 88 and 90. The holding portion 88 is mechanically coupled to the swinging movement mechanism 58 (specifically, the output shaft of the third drive unit 84), and the holding portion 90 is pivotally supported by the pivot portion 74 via a support shaft (not illustrated). The drive unit housing portion 92 is a substantially cylindrical hollow member, is disposed between the holding portion 88 and the holding portion 90, and is formed integrally with the holding portion 88 and the holding portion 90.

The rotational movement mechanism 62 includes a fourth drive unit 94 and a reduction gear 96. The fourth drive unit 94 and the reduction gear 96 are installed inside the drive unit housing portion 92. The fourth drive unit 94 is, for example, a servo motor and rotates the output shaft of the fourth drive unit 94 in accordance with a command from the control device 12. The reduction gear 96 reduces the rotational speed of the output shaft of the fourth drive unit 94 and transmits it to the work table 64.

Also, the rotational movement mechanism 62 rotates the work table 64 about an axis line A2. The axis line A2 is an axis line orthogonal to the axis line A1 and rotates around the axis line A1 together with the swinging member 60. The work table 64 is a substantially circular disk-shaped member and is disposed above the drive unit housing portion 92 in a manner allowing for rotation about the axis line A2. The work table 64 is mechanically coupled to the rotational movement mechanism 62 (specifically, the output shaft of the fourth drive unit 94), and the workpiece W is set on the work table 64 using a jig (not illustrated).

The spindle head 66 is provided to be movable in the z-axis direction of the machine coordinate system CM, and the tool 68 is detachably and attachably mounted to a tip of the spindle head 66. The spindle head 66 rotates the tool 68 about an axis line A3 and machines the workpiece W set on the work table 64 by the tool 68 that rotates. The axis line A3 is an axis line orthogonal to the axis line A1.

The spindle axis movement mechanism 70 includes a ball screw mechanism 98 that reciprocates the spindle head 66 in the z-axis direction and a fifth drive unit 100 that drives the ball screw mechanism 98. The fifth drive unit 100 is, for example, a servo motor and rotates the rotary shaft of the fifth drive unit 100 in accordance with a command from the control device 12, and the ball screw mechanism 98 converts the rotational motion of the output shaft of the fifth drive unit 100 into reciprocating motion along the z-axis of the machine coordinate system CM.

The machine coordinate system CM is set in the industrial machine 50. The machine coordinate system CM is a Cartesian coordinate system that is fixed in a three-dimensional space and serves as a reference when the operation of the industrial machine 50 is automatically controlled. In the present embodiment, the machine coordinate system CM is set such that the x-axis of the machine coordinate system CM is parallel to a rotational axis A1 of the swinging member 60 and the z-axis of the machine coordinate system CM is parallel to the vertical direction.

The industrial machine 50 relatively moves the tool 68 in the five directions with respect to the workpiece W set on the work table 64 by the translational movement mechanism 54, the swinging movement mechanism 58, the rotational movement mechanism 62, and the spindle movement mechanism 70. Accordingly, the translational movement mechanism 54, the swinging movement mechanism 58, the rotational movement mechanism 62, and the spindle movement mechanism 70 constitute a movement mechanism 102 that relatively moves the tool 68 and the workpiece W.

As illustrated in FIG. 1, the industrial machine 50 further includes a first sensor 104, a second sensor 106, a third sensor 108, a fourth sensor 110, and a fifth sensor 112. The first sensor 104 is provided on the first drive unit 76, detects the state data of the first drive unit 76, and transmits the state data to the control device 12 as feedback FB1.

For example, the first sensor 104 includes a rotation detection sensor (e.g., an encoder, a Hall element, and the like) that detects a rotational position R1 (or the rotation angle) of the output shaft of the first drive unit 76. In this case, the first sensor 104 detects the rotational position R1 and a velocity V1 of the first drive unit 76 as the state data of the first drive unit 76. The velocity V1 can determined by finding the first order derivative of the rotational position R1 with respect to time t (V1=δR1/δt). The first sensor 104 transmits, to the control device 12, position feedback indicating the rotational position R1 and velocity feedback indicating the velocity V1 as the feedback FB1.

Also, the first sensor 104 includes an electric current sensor that detects an electric current EC1 flowing through the first drive unit 76. The first sensor 104 detects the electric current EC1 as the state data of the first drive unit 76 and transmits electric current feedback indicating the electric current EC1 as the feedback FB1 to the control device 12.

Similarly, the second sensor 106 includes a rotation detection sensor that detects the rotational position R1 of the output shaft of the second drive unit 78 and an electric current sensor that detects an electric current EC2 flowing through the second drive unit 78 and detects a rotational position R2, a velocity V2 (=δR2/δt), and the electric current EC2 as the state data of the second drive unit 78. Then, the second sensor 106 transmits, to the control device 12, position feedback of the rotational position R2, velocity feedback of the velocity V2, and electric current feedback of the electric current EC2, as feedback FB2.

Similarly, the third sensor 108 includes a rotation detection sensor that detects a rotational position R3 of the output shaft of the third drive unit 84 and an electric current sensor that detects an electric current EC3 flowing through the third drive unit 84 and detects the rotational position R3, a velocity V3 (=δR3/δt), and the electric current EC3 as the state data of the third drive unit 84. Then, the third sensor 108 transmits, to the control device 12, position feedback of the rotational position R3, velocity feedback of the velocity V3, and electric current feedback of the electric current EC3, as feedback FB3.

Similarly, the fourth sensor 110 includes a rotation detection sensor that detects a rotational position R4 of the output shaft of the fourth drive unit 94 and an electric current sensor that detects an electric current EC4 flowing through the fourth drive unit 94 and detects the rotational position R4, a velocity V4 (=δR4/δt), and the electric current EC4 as the state data of the fourth drive unit 94. Then, the fourth sensor 110 transmits, to the control device 12, position feedback of the rotational position R4, velocity feedback of the velocity V4, and electric current feedback of the electric current EC4, as feedback FB4.

Similarly, the fifth sensor 112 includes a rotation detection sensor that detects a rotational position R5 of the output shaft of the fifth drive unit 100 and an electric current sensor that detects an electric current EC5 flowing through the fifth drive unit 100 and detects the rotational position R5, a velocity V5 (=δR5/δt), and the electric current EC5 as the state data of the fifth drive unit 100. Then, the fifth sensor 112 transmits, to the control device 12, position feedback of the rotational position R5, velocity feedback of the velocity V5, and electric current feedback of the electric current EC5, as feedback FB5.

In a case where the workpiece is machined by the industrial machine 50, the processor 20 transmits commands CD1, CD2, CD3, CD4, and CD5 to the first drive unit 76, the second drive unit 78, the third drive unit 84, the fourth drive unit 94, and the fifth drive unit 100, respectively, in accordance with a machining program WP. The command CD1 transmitted to the first drive unit 76 includes at least one of a position command CDP1, a velocity command CDV1, a torque command CDτ1, or an electric current command CDE1, for example.

The position command CDP1 is a command that defines a target rotational position of the output shaft of the first drive unit 76. The velocity command CDV1 is a command that defines a target velocity of the first drive unit 76. The torque command CDτ1 is a command that defines a target torque of the first drive unit 76. The electric current command CDE1 is a command that defines an electric current input to the first drive unit 76.

Similarly, the command CD2 transmitted to the second drive unit 78 includes at least one of a position command CDP2, a velocity command CDV2, a torque command CDτ2, or an electric current command CDE2, for example. Also, the command CD3 transmitted to the third drive unit 84 includes at least one of a position command CDP3, a velocity command CDV3, a torque command CDτ3, or an electric current command CDE3, for example.

Also, the command CD4 transmitted to the fourth drive unit 94 includes at least one of a position command CDP4, a velocity command CDV4, a torque command CDτ4, or an electric current command CDE4, for example. Also, the command CD5 transmitted to the fifth drive unit 100 includes at least one of a position command CDP5, a velocity command CDV5, a torque command CDτ5, or an electric current command CDE5, for example.

Figure 3:
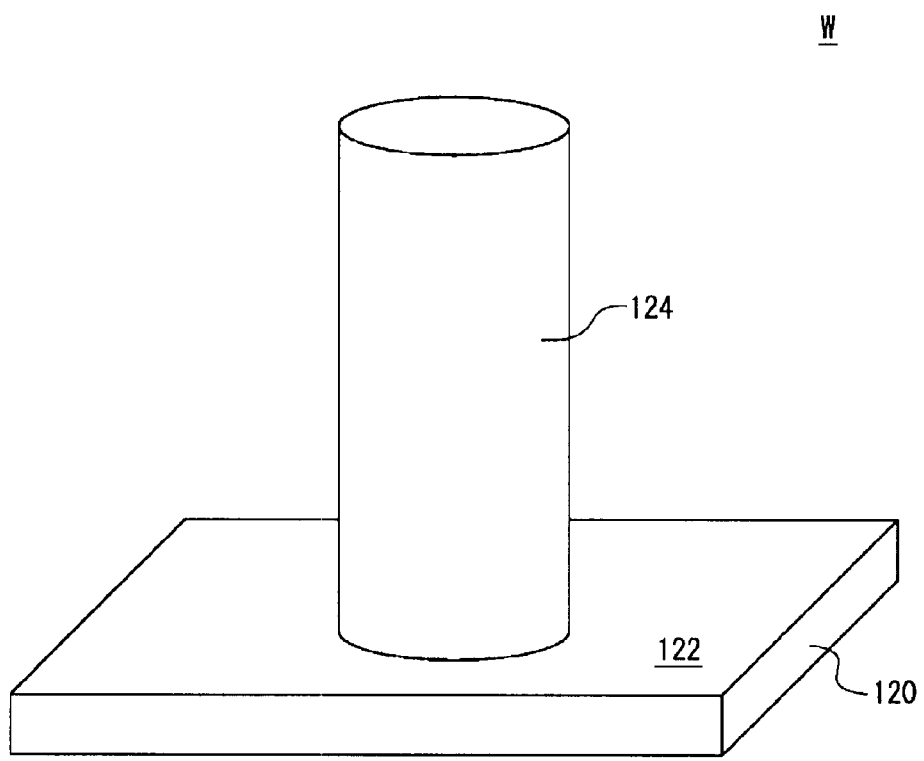
FIG. 3 illustrates an example of a workpiece machined by the industrial machine illustrated in FIG. 2.

The industrial machine 50 operates the movement mechanism 102 (specifically, the translational movement mechanism 54, the swinging movement mechanism 58, the rotational movement mechanism 62, and the spindle movement mechanism 70) in accordance with the commands CD1, CD2, CD3, CD4, and CD5 from the processor 20, moves the tool 68 and the workpiece W relative to each other, and machines the workpiece W with the tool 68. FIG. 3 illustrates an example of the workpiece W machined by the industrial machine 50. In the present embodiment, the workpiece W includes a base 120 with a substantially rectangular flat plate-like shape and a cylindrical portion 124 projecting upward from a top face 122 of the base 120.

The machining program WP is a computer program (e.g., a G code program) including a plurality of instruction statements that define a plurality of target positions on which the tool 68 is to be arranged with respect to the workpiece W, a minute line segment connecting two adjacent target positions, a target velocity of the tool 68 with respect to the workpiece W, or the like.

Figure 4:
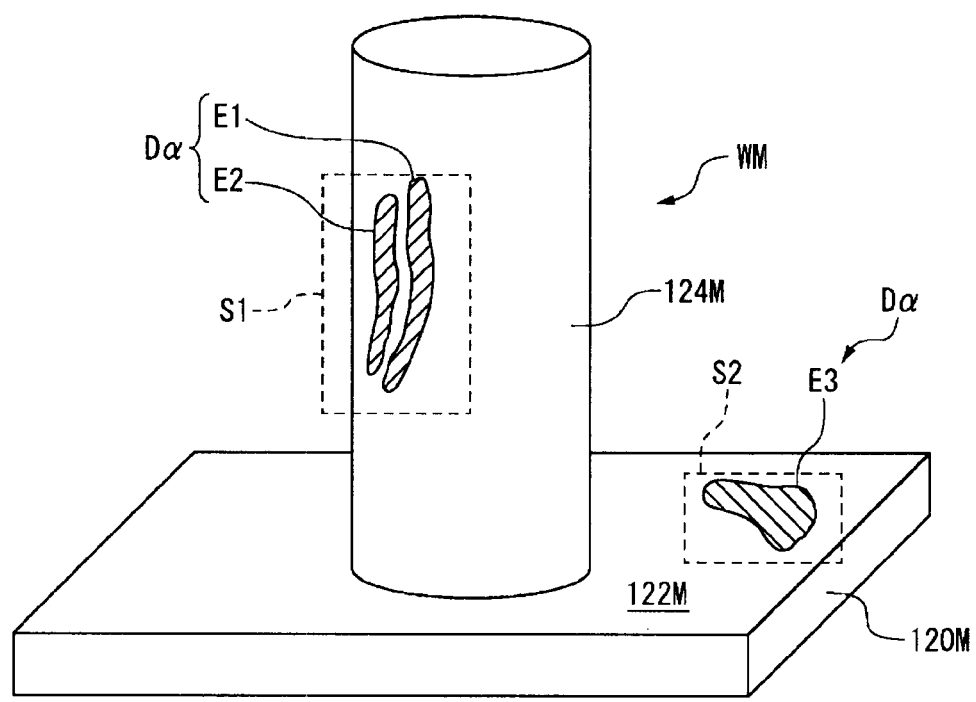
FIG. 4 illustrates an example of a workpiece model indicating a workpiece target shape.
Figure 4:
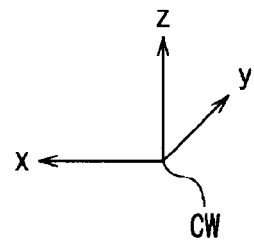

When the machining program WP is generated, an operator creates a workpiece model WM that models a target shape of the workpiece W being as a product, by using a drawing device such as a CAD. FIG. 4 illustrates the workpiece model WM. The workpiece model WM is three-dimensional model data and includes a base model 120M that is a model of the base 120 and a cylindrical portion model 124M that is a model of the cylindrical portion 124. A model coordinate system CW is set in a three-dimensional virtual model space in which a drawing device creates a model, and the workpiece model WM is constituted by the component model (point model, line model, and surface model) set in the model coordinate system CW.

Next, an operator inputs the created workpiece model WM to a program generation device such as a CAM, and the program generation device generates the machining program WP based on the workpiece model WM. Thus, the machining program WP is created based on the previously-prepared workpiece model WM and is stored in advance in the memory 22.

After the industrial machine 50 machines the workpiece W, the operator sets the post-machining workpiece W to the measurement device 18, and the measurement device 18 measures the shape of the post-machining workpiece W. Here, an error α can occur in terms of a difference between the shape of the workpiece W machined by the industrial machine 50 according to the machining program WP and the pre-prepared workpiece W target shape (i.e., the workpiece model WM).

In the present embodiment, the processor 20 generates first image data ID1 indicating a distribution Dα (first distribution) of the locations of the errors α in the workpiece W. Specifically, the measurement device 18 receives the input of the workpiece model WM and compares the workpiece model WM and the measurement data of the measured workpiece W shape to measure the error α. Note that the measurement device 18 may be configured to set a predetermined threshold value for the error α and only measure errors α that are equal to or greater than the threshold value.

The processor 20 acquires, via the I/O interface 24, the workpiece model WM, acquires the measurement data of the error α from the measurement device 18, and generates the first image data ID1 illustrated in FIG. 4, based on the workpiece model WM and the measurement data. In the first image data ID1 illustrated in FIG. 4, the distribution Dα of the locations of the errors α is indicated on the workpiece model WM, and the distribution Dα includes distribution regions E1, E2, and E3 which are visually identifiable.

Each of the distribution regions E1, E2, and E3 is constituted by a collection of a location (i.e., a point) of the error α measured by the measurement device 18 and are represented as coordinates in the model coordinate system CW. Each of the distribution regions E1, E2, and E3 corresponds to a region where the surface of the post-machining workpiece W projects outward or is recessed inward in comparison with the workpiece model WM surface model corresponding to the surface. Note that the processor 20 may display each of the distribution regions E1, E2, and E3 in a specific color (red, blue, and yellow).

As described above, in the present embodiment, the processor 20 functions as a first image generating section 152 (FIG. 1) that generates the first image data ID1. Note that the processor 20 may cause the display device 14 to display the generated first image data ID1. In this case, the processor 20 may change the viewing direction of the virtual model space defined by the model coordinate system CW in response to operation of the input device 16 by the operator. In this case, the operator can view the workpiece model WM and the distribution Dα displayed on the display device 14 from various directions.

The processor 20 generates a second image data ID2 indicating a distribution Dβ (second distribution) of locations on the workpiece W of an error β in terms of a difference between the commands CD (CD1, CD2, CD3, CD4, and CD5) transmitted to the industrial machine 50 (specifically, the first drive unit 76, the second drive unit 78, the third drive unit 84, the fourth drive unit 94, and the fifth drive unit 100) for machining of the workpiece W and the corresponding feedback FB (FB1, FB2, FB3, 1-B4, and FB5) from the industrial machine 50 (specifically, the first sensor 104, the second sensor 106, the third sensor 108, the fourth sensor 110, and the fifth sensor 112).

An example of a method for generating the second image data ID2 is described below. First, the processor 20 acquires the command CD issued during machining of the workpiece W and time-series data of the feedback FB acquired during machining Here, the processor 20, during machining of the workpiece W, associates the command CD and the feedback FB with the time t (e.g., the time from the start of machining or a reference time) and stores these as time-series data of the command CD and the feedback FB in the memory 22. The processor 20 reads out and acquires the time-series data of the command CD and the feedback FB from the memory 22 when generating the second image data ID2. Thus, in the present embodiment, the processor 20 functions as a time-series data acquisition section 154 (FIG. 1).

Also, the processor 20 generates a movement path MP of the industrial machine 50 when machining the workpiece W. As an example, the processor 20 generates a movement path MP1 defined in the machining program WP. The movement path MP1 is an aggregate of minute line segments defined in the machining program WP and is a movement path of the tool 68 (or TCP) with respect to the workpiece W in terms of control. The processor 20 can generate the movement path MP1 in the three-dimensional space by analyzing the machining program WP.

As another example, the processor 20 may generate a movement path MP2 of the industrial machine 50, based on the feedback FB acquired during machining. The movement path MP2 may be determined by calculation based on the position feedback R1, R2, R3, R4, and R5 detected by the sensors 104, 106, 108, 110, and 112 during machining, for example. The movement path MP2 is the actual movement path of the tool 68 (or TCP) with respect to the workpiece W.

Figure 5:
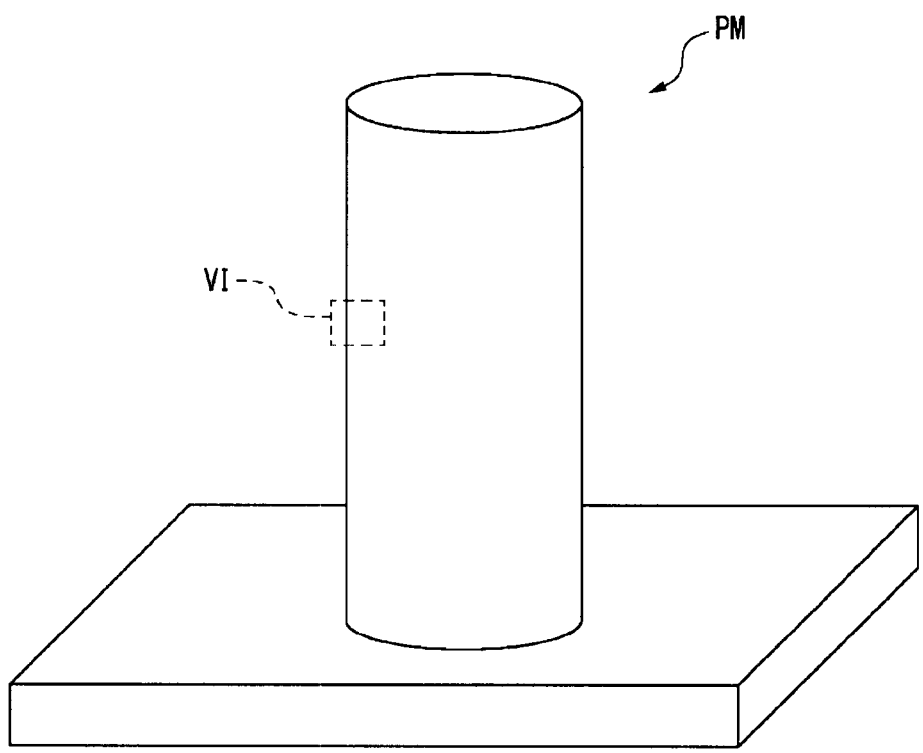
FIG. 5 illustrates an example of a path model including a movement path of an industrial machine.
Figure 5:
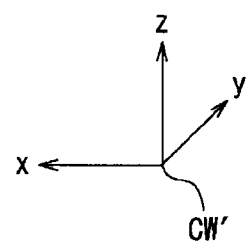
Figure 6:
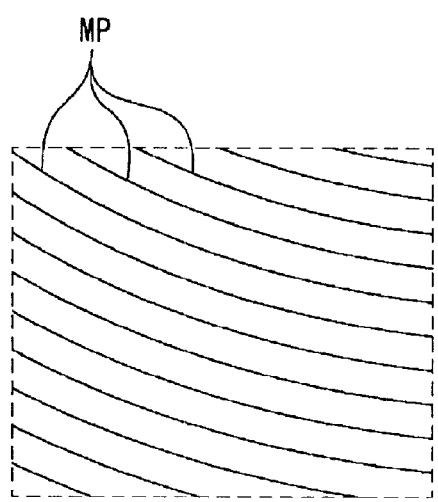
FIG. 6 is an enlarged view of a region VI in FIG. 5.

In this manner, the processor 20 generates the movement path MP (MP1 or MP2) of the industrial machine 50. Thus, in the present embodiment, the processor 20 functions as a movement path generating section 156 (FIG. 1) that generates the movement path MP. FIG. 5 illustrates an example of a path model PM in which the generated movement path MP is displayed in three dimensions. FIG. 6 is an enlarged view of a region VI of FIG. 5. As illustrated in FIG. 6, the path model PM is constituted by the movement path MP. The path model PM is a model of an external shape that substantially matches the workpiece model WM.

Note that the processor 20 is capable of setting a model coordinate system CW' with respect to the path model PM. Here, the movement path MP (MP1, MP2) is obtained as a result of executing the machining program WP generated, based on the workpiece model WM. Thus, the processor 20 is capable of setting the origin position and each axial direction of the model coordinate system CW' with respect to the path model PM illustrated in FIG. 5 to match the positional relationship of the origin position and the axial directions of the model coordinate system CW with respect to the workpiece model WM illustrated in FIG. 4. The path model PM is mapped to coordinates in the model coordinate system CW'.

Next, the processor 20 displays, on the movement path MP, the position on the movement path MP of the errors β between the command CD and the feedback FB, based on the time-series data of the command CD and the feedback FB and the movement path MP. For example, the processor 20 displays as points (plots) the position on the movement path MP of the errors β on the movement path MP of the path model PM.

Here, the movement path MP is associated together with the time-series data of the command CD and the feedback FB using the time t. Specifically, the movement path MP1 is defined in the machining program WP, and the time-series data of the command CD generated according to the machining program WP and the time-series data of the feedback FB corresponding to the command CD are associated together using the time t. Also, the movement path MP2 is associated with the time-series data of the feedback FB generated from the feedback FB and the time-series data of the command CD corresponding to the feedback FB using the time t.

Thus, the processor 20 can identify the time t at which the error β has occurred from the time-series data of the command CD and the feedback FB and can identify the point on the movement path MP at the time t. In this manner, the processor 20 generates the second image data ID2 indicating the distribution Dβ by displaying, on the movement path MP of the path model PM, the positions on the movement path MP of the errors β. Note that the processor 20 may be configured to set a predetermined threshold value for the errors β and only display the errors β equal to or greater than the threshold value on the movement path MP.

Figure 7:
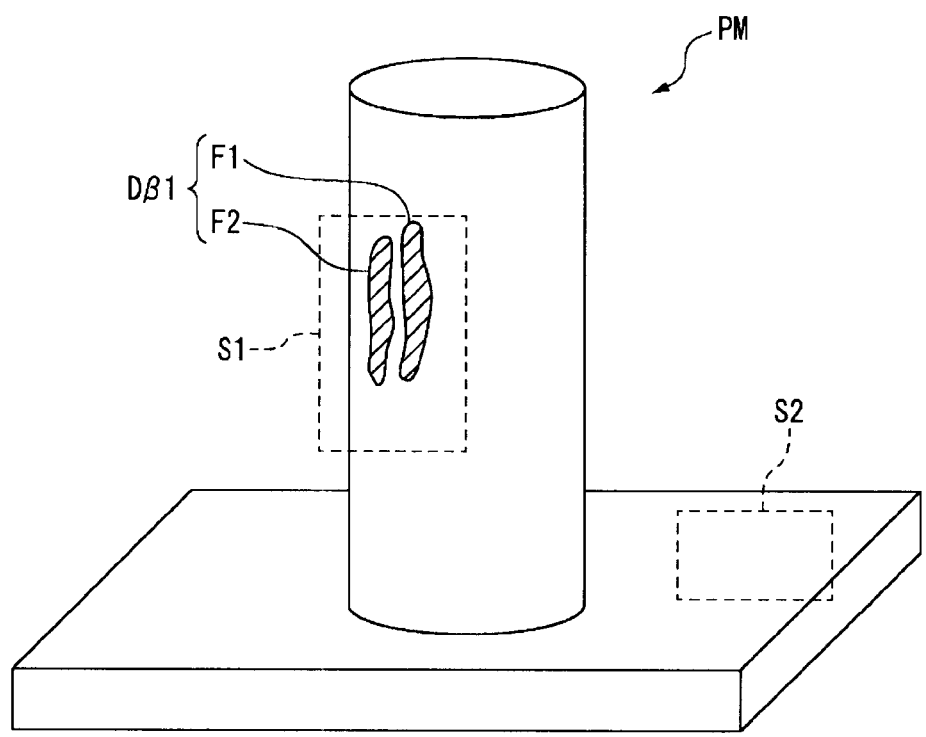
FIG. 7 is a diagram illustrating a distribution of an error between a command and feedback for a first drive unit on the path model illustrated in FIG. 5.
Figure 7:
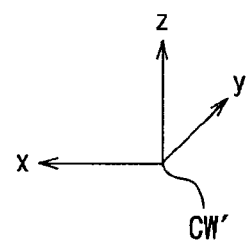

FIG. 7 illustrates an example of second image data ID2_1 indicating a distribution Dβ1 of the locations of errors β between the command CD1 to the first drive unit 76 and the feedback FB1 corresponding to the command CD1. The error β1 is, for example, an error between the position command CDP1 and position feedback R1, an error between the velocity command CDV1 and velocity feedback V1, or an error between the torque command CDτ1 (or the electric current command CDE1) and electric current feedback EC1.

In the second image data ID2_1 illustrated in FIG. 7, the distribution Dβ1 of the locations of the errors β is indicated on the path model PM, and the distribution Dβ1 includes distribution regions F1 and F2. Each of the distribution regions F1 and F2 is a collection of the locations (displayed as points) of the errors β displayed (plotted) on the movement path MP.

Figure 8:
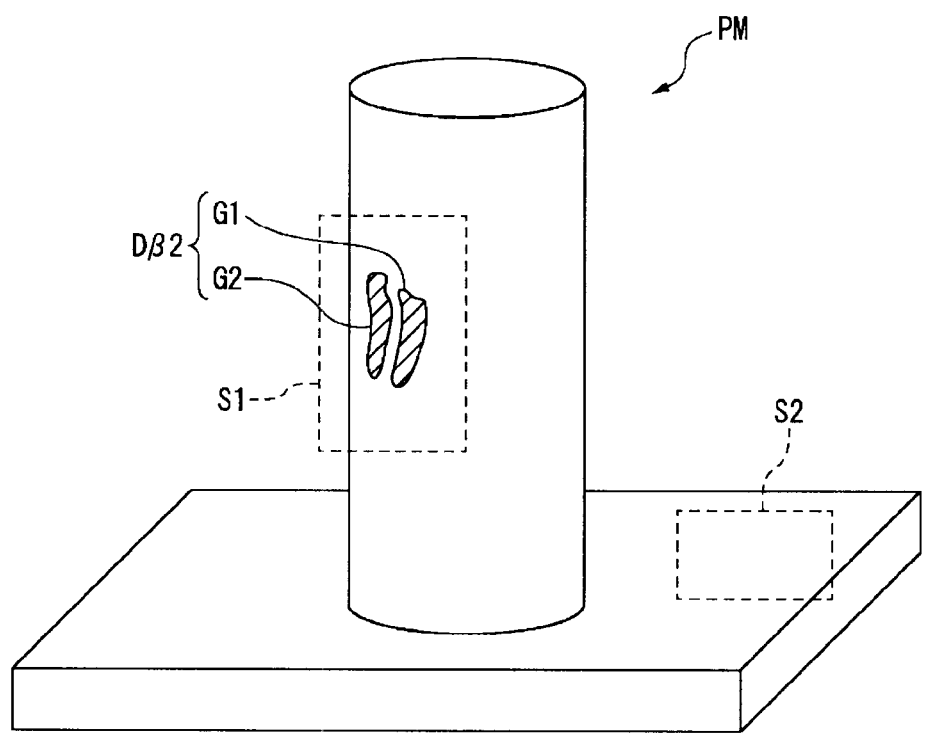
FIG. 8 is a diagram illustrating a distribution of an error between a command and feedback for a second drive unit on the path model illustrated in FIG. 5.
Figure 8:
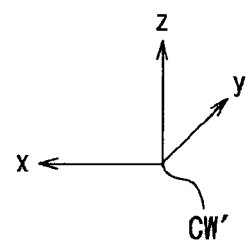

FIG. 8 illustrates an example of second image data ID2_2 indicating a distribution Dβ2 of the locations of errors β2 between the command CD2 to the second drive unit 78 and the feedback FB2 corresponding to the command CD2. The error β2 is, for example, an error between the position command CDP2 and position feedback R2, an error between the velocity command CDV2 and velocity feedback V2, or an error between the torque command CDτ2 (or the electric current command CDE2) and electric current feedback EC2. In the second image data ID2_2 illustrated in FIG. 8, the distribution Dβ2 including distribution regions G1 and G2 is indicated on the path model PM.

Figure 9:
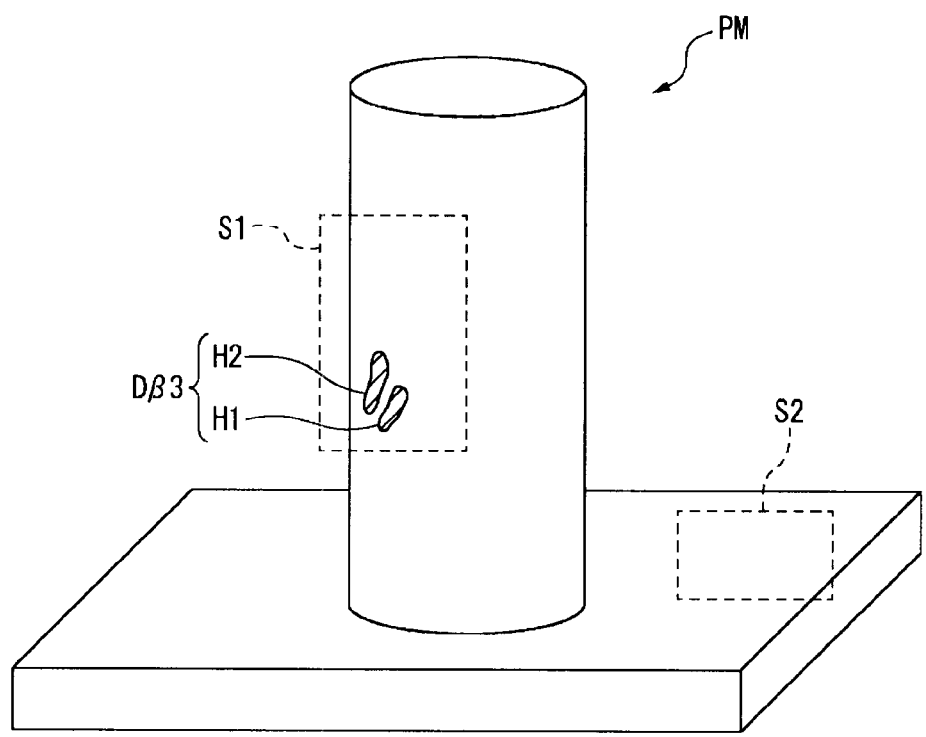
FIG. 9 is a diagram illustrating a distribution of an error between a command and feedback for a third drive unit on the path model illustrated in FIG. 5.

FIG. 9 illustrates an example of second image data ID2_3 indicating a distribution Dβ3 of the locations of errors β3 between the command CD3 to the third drive unit 84 and the feedback FB3 corresponding to the command CD3. The error β3 is, for example, an error between the position command CDP3 and position feedback R3, an error between the velocity command CDV3 and velocity feedback V3, or an error between the torque command CDτ3 (or the electric current command CDE3) and electric current feedback EC3. In the second image data ID2_3 illustrated in FIG. 9, the distribution Dβ3 including distribution regions H1 and H2 is indicated on the path model PM.

Figure 10:
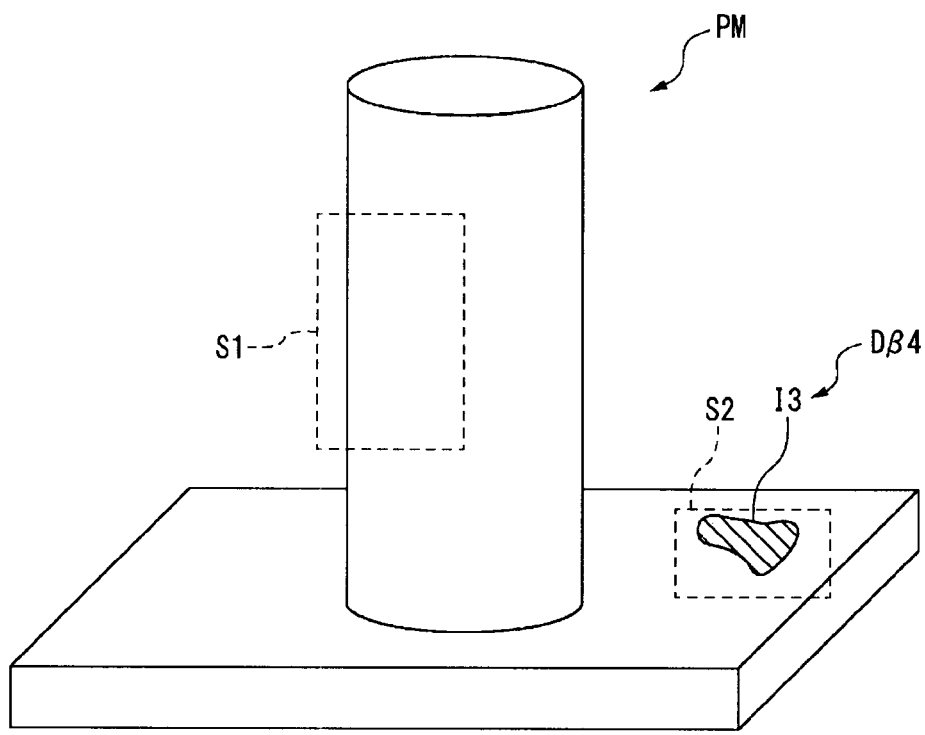
FIG. 10 is a diagram illustrating a distribution of an error between a command and feedback for a fourth drive unit on the path model illustrated in FIG. 5.

FIG. 10 illustrates an example of second image data ID2_4 indicating a distribution Dβ4 of the locations of errors β4 between the command CD4 to the fourth drive unit 94 and the feedback FB4 corresponding to the command CD4. The error β4 is, for example, an error between the position command CDP4 and position feedback R4, an error between the velocity command CDV4 and velocity feedback V4, or an error between the torque command CDτ4 (or the electric current command CDE4) and electric current feedback EC4. In the second image data ID2_4 illustrated in FIG. 10, the distribution Dβ4 including a distribution region I3 is indicated on the path model PM.

Figure 11:
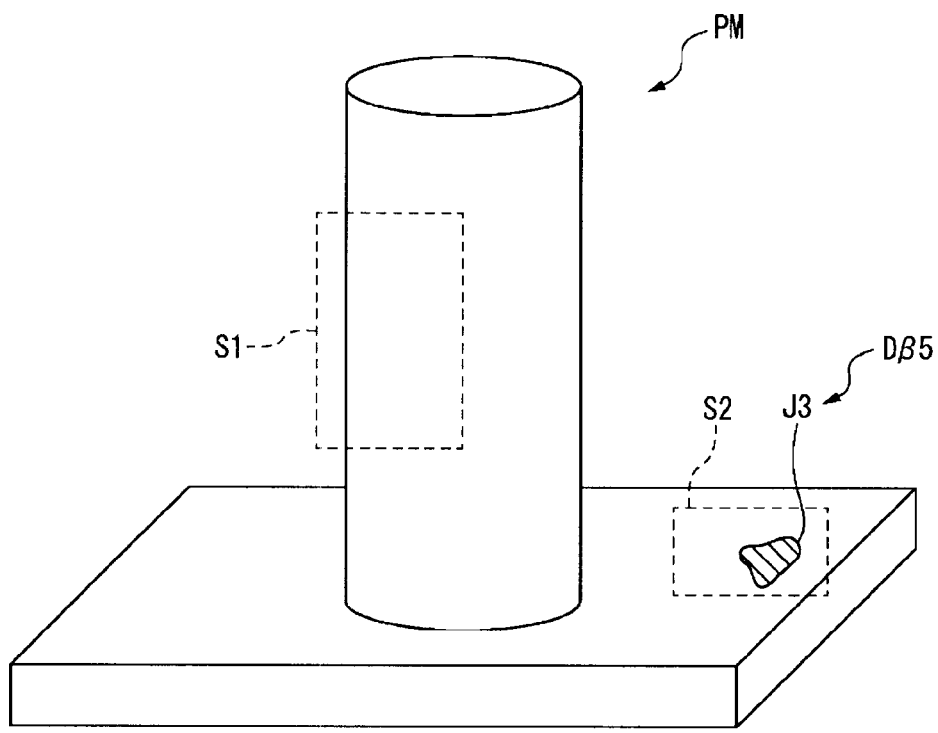
FIG. 11 is a diagram illustrating a distribution of an error between a command and feedback for a fifth drive unit on the path model illustrated in FIG. 5.

FIG. 11 illustrates an example of second image data ID2_5 indicating a distribution Dβ5 of the locations of errors β5 between the command CD5 to the fifth drive unit 100 and the feedback FB5 corresponding to the command CD5. The error β5 is, for example, an error between the position command CDP5 and position feedback R5, an error between the velocity command CDV5 and velocity feedback V5, or an error between the torque command CDτ5 (or the electric current command CDE5) and electric current feedback EC5. In the second image data ID2_5 illustrated in FIG. 11, the distribution Dβ5 including a distribution region J3 is indicated on the path model PM.

As illustrated in FIGS. 7 to 11, the second image data ID2_1, ID2_2, ID2_3, ID2_4, and ID2_5 indicate the distributions Dβ1, Dβ2, Dβ3, Dβ4, and Dβ5 of the errors β1, β2, β3, β4, and β5 for each of the drive units 76, 78, 84, 94, and 100. Note that the processor 20 may individually generate the image data ID2_1, ID2_2, ID2_3, ID2_4, and ID2_5 as the second image data ID2. In this case, the second image data ID2 includes a total of five pieces of image data, i.e., the image data ID2_1, ID2_2, ID2_3, ID2_4, and ID2_5.

Alternatively, the processor 20 may generate the second image data ID2 as image data including the image data ID2_1, ID2_2, ID2_3, ID2_4, and ID2_5 merged as a single piece of image data. In this case, the second image data ID2 is image data including the path model PM and the distribution regions F1, F2, G1, G2, H1, H2, I3, and J3 distributed on the path model PM.

As described above, in the present embodiment, the processor 20 functions as a second image generating section 158 (FIG. 1) that generates the second image data ID2. Note that the processor 20 may cause the display device 14 to display the generated second image data ID2. In this case, the processor 20 may change the viewing direction of the virtual model space defined by the model coordinate system CW' in response to operation of the input device 16 by the operator. Accordingly, the operator can view the path model PM and the distribution Dβ displayed on the display device 14 from various directions. The processor 20 may cause the display device 14 to display the first image data ID1 and the second image data ID2 next to each other.

The processor 20 obtains a correlation CR between the distribution Dα of the first image data ID1 and the distribution Dβ of the second image data ID2, based on the first image data ID1 and the second image data ID2. In the present embodiment, first, the operator operates the input device 16 to specify a specific zone S for the distribution Dα of the first image data ID1.

For example, as illustrated in FIG. 4, the operator operates the input device 16 while viewing the first image data ID1 displayed on the display device 14 and specifies a zone S1 in the first image data ID1 to include the distribution regions E1 and E2 of the distribution Dα. The processor 20 receives input information input to the input device 16 via the I/O interface 24.

In this manner, in the present embodiment, the processor 20 functions as an input reception section 160 (FIG. 1) that accepts input information specifying the zone S1 in the first image data ID1. The processor 20 extracts the distribution regions E1 and E2 included in the specified zone S1 in accordance with the input information.

Next, as illustrated in FIGS. 7 to 11, the processor 20 sets the zone S1 to a position (specifically, the same position) in the second image data ID2_1, ID2_2, ID2_3, ID2_4, and ID2_5 corresponding to the zone S1 specified in the first image data ID1.

As described above, the positional relationship of the workpiece model WM in the model coordinate system CW and the positional relationship of the path model PM in the model coordinate system CW' match each other. Thus, the processor 20 can set the zone S1 at the same position as in the first image data ID1 in the second image data ID2_1, ID2_2, ID2_3, ID2_4, and ID2_5, based on the input information of the zone S1.

Then, the processor 20 extracts the distribution regions F1 and F2 included in the set zone S1 from the distribution D131 in the second image data ID2_1 illustrated in FIG. 7. Also, the processor 20 extracts the distribution regions G1 and G2 included in the zone S1 from the distribution Dβ2 in the second image data ID2_2 illustrated in FIG. 8. Also, the processor 20 extracts the distribution regions H1 and H2 included in the zone S1 from the distribution Dβ3 in the second image data ID2_3 illustrated in FIG. 9. On the other hand, in the second image data ID2_4 and ID2_5 illustrated in FIGS. 10 and 11, the distributions Dβ4 and Dβ5 are not included in the set zone S1.

Then, the processor 20 obtains a correlation CR1_1 between the distribution Dα (distribution regions E1 and E2) in the zone S1 illustrated in FIG. 4 and the distribution Dβ1 (distribution regions F1 and F2) in the zone S1 illustrated in FIG. 7. The method of obtaining the correlation CR1_1 is described below. As an example, the processor 20 converts the distribution regions E1 and E2 in the zone S1 illustrated in FIG. 4 into two-dimensional image data. Also, as illustrated in FIG. 7, the processor 20 converts the distribution regions F1 and F2 in the zone S1 into two-dimensional image data when the path model PM is viewed from the direction same as a direction in which the workpiece model WM is viewed in FIG. 4.

Figure 12:
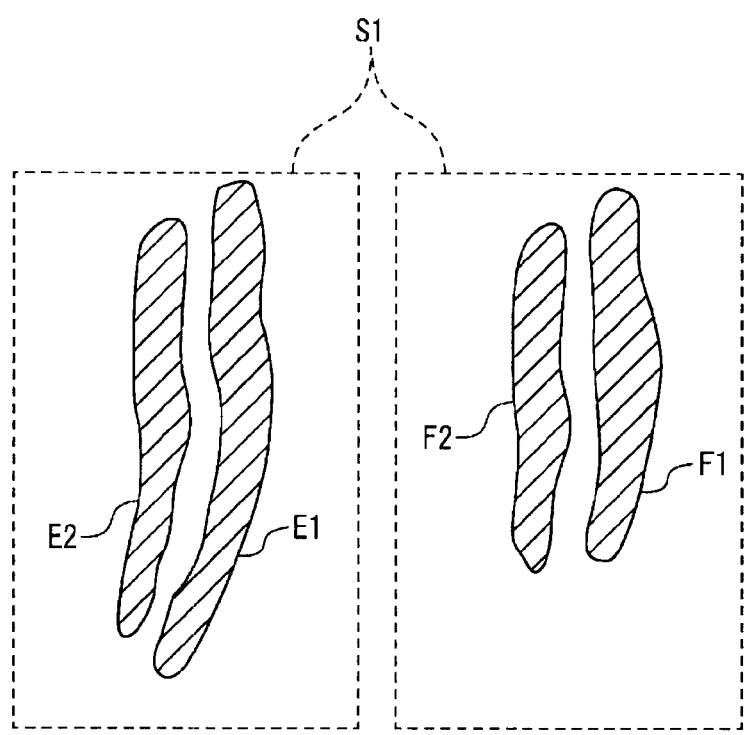
FIG. 12 is a diagram illustrating a two-dimensional image of a zone S1 in FIG. 4 and a two-dimensional image of the zone S1 in FIG. 7 displayed next to each other.

An example of obtaining an image of such two-dimensional image data is illustrated in FIG. 12. Then, the processor 20 determines via calculation the similarity between the images (or shapes) of the distribution regions E1 and E2 and the images of the distribution regions F1 and F2, converted into two-dimensional image data in FIG. 12, as a parameter indicating the correlation CR1_1. The similarity is a parameter indicating the degree of similarity between two images (shapes) and, for example, is determined, based on the distance between intermediate images obtained via matching by correlation of the luminance of two images or orthogonal-transforming (Fourier transforming, discrete cosine transforming) of each image.

Higher values (or lower values) for similarity indicate that the two images (shapes) are similar (i.e., have a high similarity). Thus, in a case where the correlation CR1_1 is obtained in terms of similarity, high (or low) similarity between the distribution regions E1 and E2 and the distribution regions F1 and F2 quantitatively indicated a high similarity.

In another example of a method of obtaining the correlation CR1_1, the processor 20 overlays the two-dimensional image data of the distribution regions E1 and E2 and the distribution regions F1 and F2, as illustrated in FIG. 12, so that the outer frames of the image data match each other. Then, the processor 20 acquires the area or the number of pixels in the region where the distribution regions E1 and E2 and the distribution regions F1 and F2 overlap as the correlation CR1_1. A large area or number of pixels quantitatively indicates a high correlation between the distribution regions E1 and E2 and the distribution regions F1 and F2.

In yet another example of a method of obtaining the correlation CR1_1, the processor 20 converts the distribution regions F1 and F2 in the model coordinate system CW' illustrated in FIG. 7 into that in the model coordinate system CW illustrated in FIG. 4 and overlays them with the distribution regions E1 and E2 in the model coordinate system CW. Here, each display point constituting the distribution Dβ1 in the second image data ID2_1 is represented as a coordinate of the model coordinate system CW'. Also, as described above, the position of the workpiece model WM in the model coordinate system CW and the position of the path model PM in the model coordinate system CW' match each other.

Thus, the distribution regions E1 and E2 and the distribution regions F1 and F2 can be overlaid in the model coordinate system CW by plotting the coordinates of the model coordinate system CW' of the distribution regions F1 and F2 in FIG. 7 in the model coordinate system CW in FIG. 4. Then, the processor 20 acquires, as the correlation CR1_1, the area of the region in which the distribution regions E1 and E2 and the converted distribution regions F1 and F2 overlap (or are close to each other within a predetermined distance) in the model coordinate system CW. A large area quantitatively indicates a high correlation between the distribution Dα and the distribution Dβ1. The correlation CR1_1 can be obtained by using the method described above.

By using a similar method, the processor 20 can obtain a correlation CR1_2 between the distribution Dα (E1 and E2) in the zone S1 in FIG. 4 and the distribution Dβ2 (G1 and G2) in the zone S1 in FIG. 8, a correlation CR1_3 between the distribution Dα in the zone S1 in FIG. 4 and the distribution Dβ3 (H1 and H2) in the zone S1 in FIG. 9, a correlation CR1_4 between the distribution Dα in the zone S1 in FIG. 4 and the distribution Dβ4 (not present) in the zone S1 in FIG. 10, and a correlation CR1_5 between the distribution Dα in the zone S1 in FIG. 4 and the distribution Dβ5 (not present) in the zone S1 in FIG. 11.

As described above, the processor 20 obtains the correlation CR1 between the distribution Dα and the distribution Dβ, based on the first image data ID1 and the second image data ID2. Accordingly, the processor 20 functions as a correlation acquisition section 162 that obtains the correlation CR1 (FIG. 1). In addition, in the present embodiment, the processor 20 obtains the correlation CR1_1, CR1_2, CR1_3, CR1_4, and CR1_5 between the distribution Dα and the distributions Dβ1, Dβ2, Dβ3, Dβ4, Dβ5 for each of the drive units 76, 78, 84, 94, 100.

Next, the processor 20 generates order image data OD1 in which the first drive unit 76, the second drive unit 78, the third drive unit 84, the fourth drive unit 94, and the fifth drive unit 100 are displayed next to each other in an order of the degree of the correlation, based on the obtained correlations CR1_1, CR1_2, CR1_3, CR1_4, and CR1_5. An example of an image of the order image data OD1 is illustrated in FIG. 13.

Figure 13:
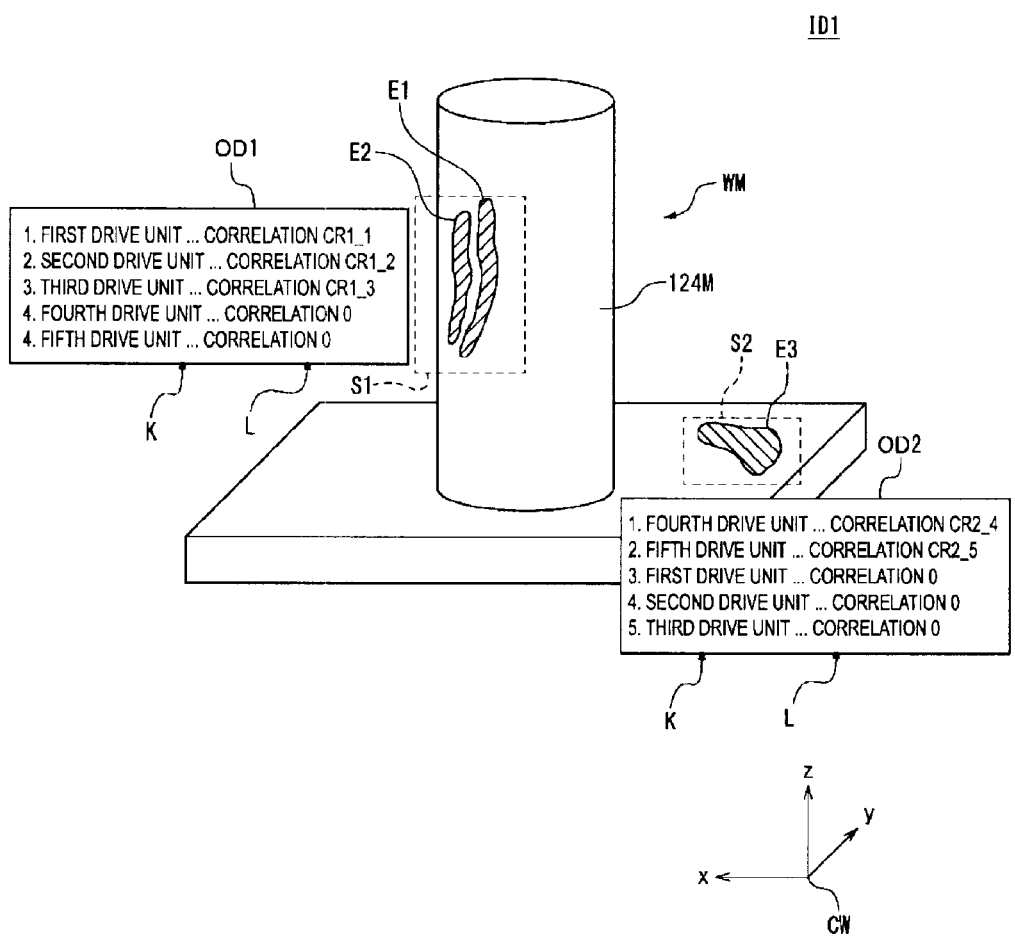
FIG. 13 is a diagram illustrating order image data overlaid on the image data illustrated in FIG. 4.

As illustrated in FIG. 13, in the present embodiment, the processor 20 displays the order image data OD1 overlaid on the first image data ID1. In this embodiment, the magnitude of the correlations CR1 is such that CR1_1>CR1_2>CR1_3>CR1_4=CR1_5=0. Thus, in the set zone S1, the distribution regions F1 and F2 of the error β1 relating to the first drive unit 76 have the highest correlation CR1_1 with the distribution Dα (distribution regions E1 and E2), and the distribution regions G1 and G2 of the error β2 relating to the second drive unit 78 have the second highest correlation CR1_2, and the distribution regions H1 and H2 of the error β3 relating to the third drive unit 84 have the third highest correlation CR1_3.

On the other hand, for the distribution Dβ of the errors β4 and β5 relating to the fourth drive unit 94 and the fifth drive unit 100, the correlation CR1 with the distribution Dα is zero (i.e., no correlation). Thus, as illustrated in FIG. 13, in the order image data OD1, the plurality of drive units 76, 78, 84, 94, and 100 are displayed next to each other in order of the first drive unit 76 in first place, the second drive unit 78 in second place, the third drive unit 84 in third place, and the fourth drive unit 94 and the fifth drive unit 100 in fourth place.

Also, in the present embodiment, in the order image data OD1, together with the order of the drive units 76, 78, 84, 94, and 100, an identification information column K indicating information (e.g., a character string, an identification number, a symbol, or the like) for identifying the drive unit and a correlation information column L indicating information (e.g., a numerical value) of the correlation CR1.

As described above, in the present embodiment, the processor 20 functions as a third image generating section 164 (FIG. 1) that generates the order image data OD1. With this order image data OD1, the operator can visually recognize the order of the correlation CR1 between the distribution Dα (E1, E2) of the error α in the specified zone S1 and the distribution DP of the error β of the drive units 76, 78, 84, 94, and 100.

Figure 14:
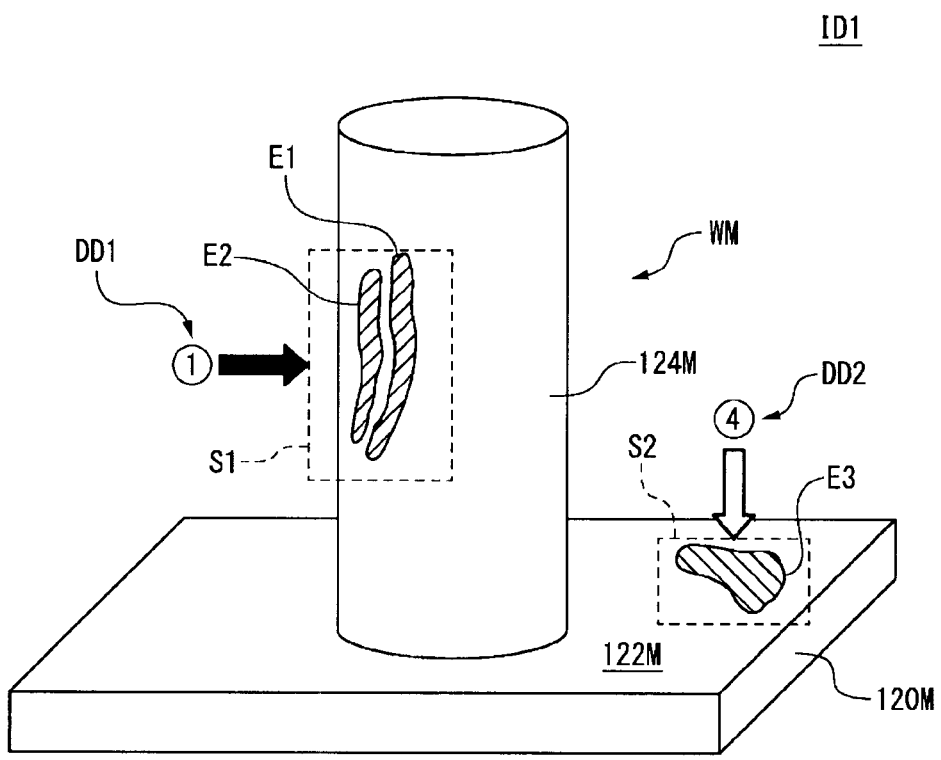
FIG. 14 is a diagram illustrating identification image data overlaid on the image data illustrated in FIG. 4.

Note that the processor 20 may function as the third image generating section 164 and may generate identification image data DD1 for identifying the drive unit 76 with the highest correlation CR1 instead of (or in addition to) the order image data OD1. An example of the identification image data DD1 is illustrated in FIG. 14. In the example illustrated in FIG. 14, the identification image data DD1 includes an arrow pointing to the zone S1 and a symbol (specifically, a number in a circle symbol) that identifies the first drive unit 76 with the highest correlation CR1 and is displayed in the first image data ID1. With the identification image data DD1, the operator can visually recognize that the distribution Dα (E1, E2) of the error α in the specified zone S1 has the highest correlation with the distribution Dβ1 (F1, F2) of the error β1 relating to the first drive unit 76.

Similarly, as illustrated in FIG. 4, the operator operates the input device 16 while viewing the first image data ID1 displayed on the display device 14 and specifies a zone S2 in the first image data ID1 to include the distribution region E3 of the distribution Dα. The processor 20 functions as the input reception section 160 and receives the input information specifying the zone S2 and, as illustrated in FIGS. 7 to 11, sets the zone S2 at the same position as the zone S2 specified in the first image data ID1 for the second image data ID2_1, ID2_2, ID2_3, ID2_4, and ID2_5.

Then, the processor 20 functions as the correlation acquisition section 162 and uses the method described above to obtain a correlation CR2_1 between the distribution Dα (E3) in the zone S2 in FIG. 4 and the distribution Dβ1 (not present) in the zone S2 in FIG. 7, a correlation CR2_2 between the distribution Dα in the zone S2 in FIG. 4 and the distribution Dβ2 (not present) in the zone S2 in FIG. 8, a correlation CR2_3 between the distribution Dα in the zone S2 in FIG. 4 and the distribution Dβ3 (not present) in the zone S2 in FIG. 9, a correlation CR2_4 between the distribution Dα in the zone S2 in FIG. 4 and the distribution Dβ4 (I3) in the zone S2 illustrated in FIG. 10, and a correlation CR2_5 between the distribution Dα in the zone S2 in FIG. 4 and the distribution Dβ5 (J3) in the zone S2 illustrated in FIG. 11.

Next, the processor 20 functions as the third image generating section 164 and generates order image data OD2 (FIG. 13) in which the first drive unit 76, the second drive unit 78, the third drive unit 84, the fourth drive unit 94, and the fifth drive unit 100 are displayed next to each other in an order of the degree of the correlation, based on the obtained correlations CR2_1, CR2_2, CR2_3, CR2_4, and CR2_5.

In this embodiment, the magnitude of the correlations CR2 is such that

CR2_4>CR2_5>CR2_1=CR2_2=CR2_3=0. Thus, in the set zone S2, the distribution region I3 of the error β4 relating to the fourth drive unit 94 has the highest correlation CR2_4 with the distribution Dα (distribution region E3) in the zone S2, and the distribution region J3 of the error β5 relating to the fifth drive unit 100 has the second highest correlation CR2_5.

On the other hand, for the distribution Dβ of the errors β1, β2, and β3 relating to the first drive unit 76, the second drive unit 78, and the third drive unit 84, the correlation CR2 with the distribution Dα is zero (i.e., no correlation). Thus, as illustrated in FIG. 13, in the order image data OD2, the plurality of drive units 76, 78, 84, 94, and 100 are displayed next to each other in order of the fourth drive unit 94 in first place, the fifth drive unit 100 in second place, and the first drive unit 76, the second drive unit 78, and the third drive unit 84 in third place.

Also, the processor 20 may function as the third image generating section 164 and may generate identification image data DD2 for identifying the drive unit 94 with the highest correlation CR2, as illustrated in FIG. 14. The identification image data DD2 includes an arrow pointing to the zone S2 and a symbol that identifies the fourth drive unit 94 with the highest correlation CR2 and is displayed in the first image data ID1. Note that the processor 20 may display the order image data OD1 and OD2 or the identification image data DD1 and DD2 overlaid on the second image data ID2 or may display these as image data separate from the first image data ID1 and the second image data ID2.

As described above, in the present embodiment, the processor 20 functions as the first image generating section 152, the second image generating section 158, the third image generating section 164, the correlation acquisition section 162, the input reception section 160, the time-series data acquisition section 154, and the movement path generating section 156, and the first image generating section 152, the second image generating section 158, the third image generating section 164, the correlation acquisition section 162, the input reception section 160, the time-series data acquisition section 154, and the movement path generating section 156 form an image analysis device 150 (FIG. 1).

Note that the image analysis device 150 may be configured as a computer program (i.e., software). The computer program causes a computer (the processor 20) to function as the first image generating section 152, the second image generating section 158, the third image generating section 164, the correlation acquisition section 162, the input reception section 160, the time-series data acquisition section 154, and the movement path generating section 156 in order to perform image analysis.

According to the present embodiment, the operator can determine whether or not the error α is highly likely to have been caused by the error β by taking into account the correlation CR between the distribution Dα of the error α and the distribution Dβ of the error β. Thus, the operator can easily identify the cause of the error α. As a result, the efficiency of the process of improving the machining accuracy of the industrial machine 50 and of the process of starting up the mechanical system 10 can be improved.

In addition, in the present embodiment, the processor 20 generates the second image data ID2_1, ID2_2, ID2_3, ID2_4, and ID2_5 indicating the distributions Dβ1, Dβ2, Dβ3, Dβ4, and Dβ5 of the error β for each of the drive units 76, 78, 84, 94, and 100 and obtains the correlations CR1 and CR2 between the distribution Dα of the error α and the distributions Dβ1, Dβ2, Dβ3, Dβ4, and Dβ5 of the error β for each of the drive units 76, 78, 84, 94, and 100.

According to this configuration, the operator can easily estimate which one of the plurality of drive units 76, 78, 84, 94, and 100 is highly likely of being the cause of the error α. For example, in the case of the above-described embodiment, the operator can estimate that the error β1 relating to the first drive unit 76 is highly likely to be the cause relating to the distribution regions E1 and E2 of the distribution Dα of the error α in FIG. 4. Also, the operator can estimate that the error β4 relating to the fourth drive unit 94 is highly likely to be the cause relating to the distribution region E3 of the distribution Dα of the error α in FIG. 4.

Additionally, in the present embodiment, the processor 20 receives the input information specifying the zone S1 (S2) and obtains the correlation CR1 (CR2) between the distribution regions E1 and E2 (E3) included in the zone S1 (S2) of the distribution Dα and the distribution regions F1 and F2, G1 and G2, and H1 and H2 (I3, J3) included in the zone S1 (S2) of the distribution Dβ. According to this configuration, the operator can take into account the correlation CR for the desired region of the distribution Dα, making it easier to identify the cause of the error α in the desired region.

Note that at least one function of the first image generating section 152, the second image generating section 158, the third image generating section 164, the correlation acquisition section 162, the input reception section 160, the time-series data acquisition section 154, or the movement path generating section 156 illustrated in FIG. 1 may be provided in an external device of the control device 12. Such an embodiment is illustrated in FIG. 15.

Figure 15:
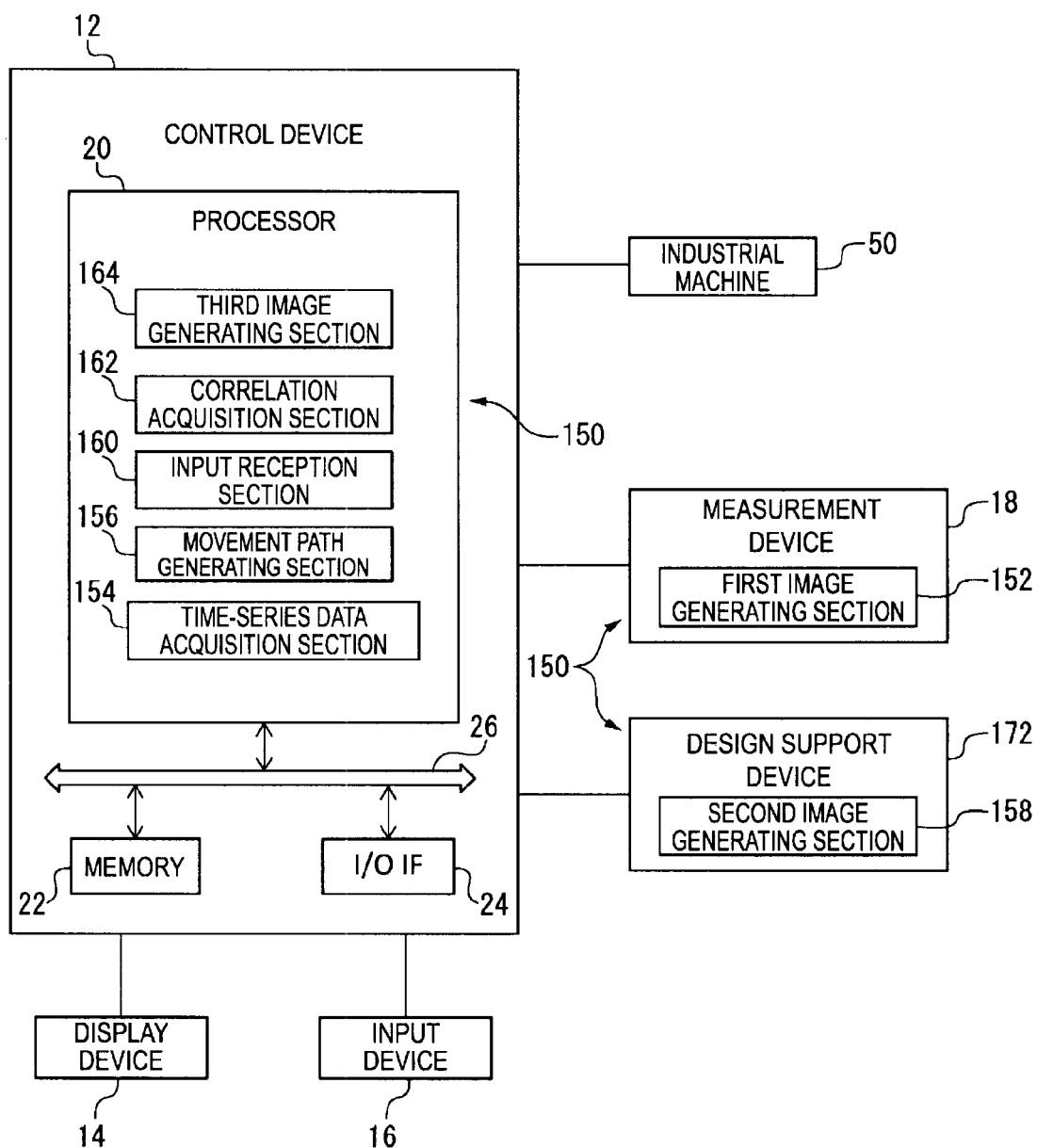
FIG. 15 is a block diagram of a mechanical system according to another embodiment.

A mechanical system 170 illustrated in FIG. 15 includes the control device 12, the display device 14, the input device 16, the measurement device 18, the industrial machine 50, and a design support device 172. The design support device 172 is a device in which a drawing device such as CAD and program generating device such as CAM is integrated and is connected to the I/O interface 24 of the control device 12.

In the present embodiment, the measurement device 18 functions as the first image generating section 152 and measures the shape of the post-machining workpiece W and generates the first image data ID1. Additionally, the design support device 172 functions as the second image generating section 158 and generates the second image data ID2. Thus, in the present embodiment, the processor 20 of the control device 12, the measurement device 18, and the design support device 172 constitute the image analysis device 150.

Note that in the embodiments described above, the processor 20 functions as the input reception section 160 that receives the specified input information of the zones S1 and S2. However, the input reception section 160 may be omitted. In this case, the processor 20 may obtain the correlation CR between the entire distribution Dα of the first image data ID1 and the entire distribution Dβ (Dβ1, Dβ2, Dβ3, Dβ4, and Dβ5) of the second image data ID2.

Also, in the embodiment described above, the processor 20 generates the second image data ID2 by displaying the positions on the movement path MP of the errors β on the movement path MP. However, no such limitation is intended, and, for example, the processor 20 may generate the second image data ID2 indicating the distribution Dβ of the error β on the workpiece model WM, based on the command CD, the feedback FB, and the workpiece model WM. In this case, the movement path generating section 156 can be omitted.

Additionally, in the above-described embodiment, the processor 20 acquires the time-series data of the command CD and the feedback FB. However, no such limitation is intended, and the processor 20 may use any data as long as the error β can be acquired. In this case, the time-series data acquisition section 154 can be omitted. Also, the third image generating section 164 may be omitted from the above-described embodiment, and, for example, the processor 20 may be configured to transmit the obtained correlation CR to an external device (such as a server) via a network (LAN, internet).

Figure 16:
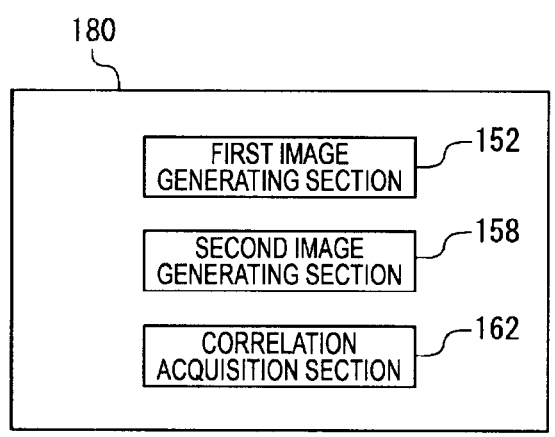
FIG. 16 is a block diagram of an image analysis device according to another embodiment.

FIG. 16 illustrates an image analysis device 180 according to another embodiment. The image analysis device 180 is constituted by a computer including a processor (CPU, GPU, or the like) and a memory (ROM, RAM, or the like) or a computer program that causes the computer to operate and includes the first image generating section 152, the second image generating section 158, and the correlation acquisition section 162. In this embodiment, the functions of the input reception section 160, the time-series data acquisition section 154, the movement path generating section 156, and the third image generating section 164 described above may be provided in the external device of the image analysis device 180.

Note that the above-described commands CD1, CD2, CD3, CD4, or CD5 may include a position command or a velocity command of a driven body (e.g., the base table 52, the swinging member 60, the work table 64, or the spindle head 66) driven by the drive unit 76, 78, 84, 94, or 100. In this case, the feedback FB includes position feedback or velocity feedback of the driven body, and the industrial machine 50 includes a sensor that detects the position of the driven body.

Additionally, the processor 20 may display the distribution Dα in different colors depending on the magnitude of the error α in the first image data ID1 illustrated in FIG. 4. Similarly, the processor 20 may display the distribution Dβ in different colors depending on the magnitude of the error β in the second image data ID2 illustrated in FIGS. 7 to 11.

Alternatively, the processor 20 (or the measurement device 18) may generate a measurement workpiece model that is a model of the shape of the measured workpiece W, based on the measurement data of the shape of the workpiece W measured by the measurement device 18. The processor 20 (or the measurement device 18) may generate the first image data ID1 indicating the distribution a of the error α on the measurement workpiece model. The processor 20 may generate the first image data ID1 indicating the distribution a of the error α on the path model PM described above.

Additionally, in the embodiment described above, the industrial machine 50 includes a total of five drive units, the drive units 76, 78, 84, 94, and 100, but may include any number of drive units. The industrial machine 50 may also include, for example, a vertically (or horizontally) articulated robot as a movement mechanism. In this case, the industrial machine 50 may include, instead of the tool 68 described above, a tool such as a laser machining head or the like mounted to the robot's hand, and the workpiece may be laser machined by a laser beam emitted from the tool while the tool is moved by the robot.

Although the present disclosure is described above through the embodiments, the above-described embodiments do not limit the invention according to the claims.

REFERENCE SIGNS LIST 10, 170 Mechanical system
12 Control device
50 Industrial machine
68 Tool
102 Movement mechanism
150, 180 Image analysis device
152 First image generating section
154 Time-series data acquisition section
156 Movement path generating section
158 Second image generating section
160 Input reception section
162 Correlation acquisition section
164 Third image generating section

The invention claimed is:

1. An image analysis device, comprising:
a processor configured to;
  generate first image data indicating a first distribution of a location on a workpiece of an error between a shape of the workpiece machined by an industrial machine and a pre-prepared target shape of the workpiece;
  generate second image data indicating a second distribution of a location on the workpiece of an error between a command transmitted to the industrial machine for machining the workpiece and feedback from the industrial machine, which corresponds to the command; and
  obtain a correlation between the first distribution and the second distribution, based on the first image data and the second image data.

2. The image analysis device of claim 1,
wherein the industrial machine includes:
  a tool configured to machine the workpiece; and
  a movement mechanism configured to move the workpiece and the tool relative to each other, the movement mechanism including a plurality of drive units configured to drive the tool relative to the workpiece in a plurality of directions, and
wherein the processor is configured to:
  generate, for each drive unit of the plurality of drive units, the second image data indicating the second distribution of the error between the command transmitted to said each drive unit and the feedback, and
  obtain the correlation between the first distribution and the second distribution of said each drive unit.

3. The image analysis device of claim 2,
wherein the processor is configured to generate:
  identification image data identifying the drive unit with a highest correlation; or
  order image data in which the plurality of drive units is displayed in an order of a degree of the correlation.

4. The image analysis device of claim 1,
wherein the processor is configured to:
  receive input information specifying a zone in the first image data, and
  obtain the correlation between a distribution region of the first distribution included in the zone and a distribution region of the second distribution included in a zone set at a position corresponding to the zone in the second image data.

5. The image analysis device of claim 1,
wherein the command includes a position command defining a position of the industrial machine, and
wherein the feedback includes position feedback indicating a position of the industrial machine detected by a sensor.

6. The image analysis device of claim 1,
wherein the processor is configured to;

acquire time-series data of the command and the feedback, generate a movement path of the industrial machine when machining the workpiece, and generate the second image data by displaying, on the movement path, a position on the movement path of the error between the command and the feedback, based on the time-series data and the movement path.

7. A control device for the industrial machine, comprising: the image analysis device of claim 1.

8. A mechanical system, comprising:

an industrial machine configured to machine a workpiece;

a measurement device configured to measure a shape of the workpiece machined by the industrial machine; and the image analysis device of claim 1, wherein the processor is configured to generate the first image data based on measurement data of the shape of the workpiece measured by the measurement device.

9. An image analysis method comprising:

generating first image data indicating a first distribution of a location on a workpiece of an error between a shape of the workpiece machined by an industrial machine and a pre-prepared target shape of the workpiece;

generating second image data indicating a second distribution of a location on the workpiece of an error between a command transmitted to the industrial machine for machining the workpiece and feedback from the industrial machine, which corresponds to the command; and obtaining a correlation between the first distribution and the second distribution, based on the first image data and the second image data.

10. A non-transitory computer readable medium storing a computer program configured to, for image analysis, cause a computer to:

generate first image data indicating a first distribution of a location on a workpiece of an error between a shape of the workpiece machined by an industrial machine and a pre-prepared target shape of the workpiece;

generate second image data indicating a second distribution of a location on the workpiece of an error between a command transmitted to the industrial machine for machining the workpiece and feedback from the industrial machine, which corresponds to the command; and obtain a correlation between the first distribution and the second distribution, based on the first image data and the second image data.

* * * * *